J. Schroy,
Cage Trap

No. 70.624.    Patented Nov. 5. 1867.

Witnesses.
Theo Tusche
J. A. Service

Inventor.
Jeremiah Schroy
Per Munn & Co
Attorneys

United States Patent Office.

JEREMIAH SCHROY, OF FORT VILLE, INDIANA.

Letters Patent No. 70,624, dated November 5, 1867.

---

IMPROVED ANIMAL TRAP.

---

*The Schedule referred to in these Letters Patent and making part of the same.*

---

TO ALL WHOM IT MAY CONCERN:

Be it known that I, JEREMIAH SCHROY, of Fort Ville, in the county of Hancock, and State of Indiana, have invented a new and useful improvement in Animal Trap; and I do hereby declare that the following is a full, clear, and exact description thereof, which will enable others skilled in the art to make and use the same, reference being had to the accompanying drawings, forming part of this specification.

This invention relates to a new and improved method of catching rats and other animals; and the invention consists in an arrangement whereby the animal is forced into a box by a revolving door, which is actuated by a spring, and which is released by the weight of the animal; and in placing a reflector where it serves as a decoy; and also in the manner in which the animal is secured in and removed from a second apartment in the box, as I will proceed to describe.

Similar letters of reference indicate like parts.

Figure 1:
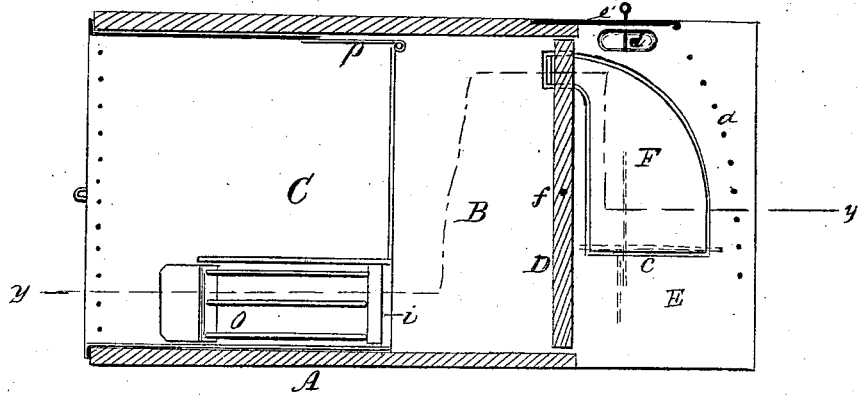
Figure 1 represents a horizontal section of the trap, showing a plan view, and the manner of its construction, it being through the line $x\ x$ of fig. 2.
Figure 2:
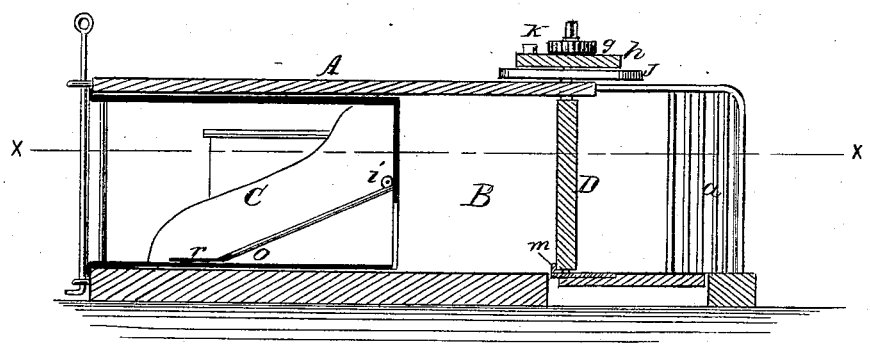
Figure 2 is a vertical section of the trap through the line $y\ y$, fig. 1.

The trap is formed of an oblong box containing two apartments, the entrance to which is through a door which revolves on a vertical pivot or shaft. A represents the box, and B C are the apartments in the box; D is the revolving door. E is the entrance upon the platform or bottom of the box. This bottom extends out beyond the box at one end, and is partially surrounded by wire grating, as seen at $a$. There is an aperture through this platform, which is filled by a trap-door, F, which is hinged to the platform $c$, and which is supported at its opposite end by a small wire spring, which keeps it pressed up to a level with the platform, but which allows the trap-door to settle or give when there is any weight placed upon it. $d$ is the place for the bait, and $e$ is a reflector or piece of looking-glass, which is placed as a decoy. $f$ is the pivot or shaft to which the revolving door is attached. On that portion of the shaft (as seen in fig. 2) which extends above the box, there is a ratchet-wheel, $g$. $h$ is a cap-piece, which is attached to the box; J is a coil spring, which is coiled around the shaft. K is a pawl, which operates in the teeth of the ratchet-wheel. The trap is set by a catch on the bottom of the revolving door, which strikes a stop (seen at $m$, fig. 2) on the trap-door. The weight of the animal on the trap-door settles it enough to disengage the catch, when the door is thrown around half a revolution, by the power of the coil spring, when it strikes the stop $m$ and is set again. The pawl K operates to produce the required friction on the ratchet, and to prevent back motion. The coil spring J is wound up by a key on the end of the shaft.

The animal, when it goes on to the trap-door after the bait, which is placed at $d$, is forcibly thrust into the chamber B, and in his efforts to escape he passes into the chamber C through the grated drop $o$, which is hinged at $i$.

The chamber C is wire-grated in front, as seen. This chamber is composed of metal, and is removable. Through the side there is a door for the removal of the animal, as seen at $p$. The drop $o$ has a plate, $n$, which rests flat on the bottom of the chamber, to which the wires are attached. This is to prevent the animal from raising the drop in his efforts to escape. This arrangement allows the chamber to be removed from the box for cleaning and other purposes.

What I claim as new, and desire to secure by Letters Patent, is—

The drop $o$ in the removable chamber C, when such drop is provided with the fixed shoe or prolongation $r$, arranged as described, whereby the weight of the animal upon said shoe prevents its being raised, as herein set forth.

JEREMIAH SCHROY.

Witnesses:
PETER STAATS,
W. M. BAKER.